United States Patent Office 3,732,140
Patented May 8, 1973

3,732,140
METHOD FOR PRODUCING A FIBROUS BUNDLE WITH A TRACER AND PRODUCT THEREOF
Gerhard N. Bolen, Granville, Robert J. Gelin, Newark, and William N. Haggerty, Reynoldsburg, Ohio, assignors to Owens-Corning Fiberglas Corporation
No Drawing. Filed Oct. 15, 1970, Ser. No. 81,108
Int. Cl. D02g 3/18, 3/36
U.S. Cl. 161—175                        13 Claims

ABSTRACT OF THE DISCLOSURE

A method of producing a fibrous bundle having a tracer therein comprising advancing glass fiber strands through a bath comprising a colorant, drying the treated strands and combining the same with a plurality of sized glass strands.

BACKGROUND OF THE INVENTION

This invention relates to a dye treatment for continuous glass fiber strands, particularly in the post-forming operation and the combination of the same with a plurality of sized glass fiber strands to form a larger bundle of fibers. The treatment comprises a dye system which is insoluble in water and substantially insoluble in resin, particularly polyester resin, and which is capable of being air dried and which is also capable of being compatible with standard protective sizings used on the glass fibers.

Difficulties in the establishment of a dyed glass strand for use in fabricating operations are well known in the art. Some of the methods of obtaining a dyed glass strand in the prior art include vacuum impregnation of a bobbin, dyeing during the forming of glass fibers, and dyeing one of a plurality of strands advancing to a roving machine. These methods were not without their problems however. Some of these problems include poor run-out of the strand from the dyed bobbin or package, causing breaks or fuzzing of the strands, poor handleability of the packages thereby damaging the strands or making it impossible to pay off strands therefrom, and low processing efficiencies.

During fabricating operations such as in spray-up molding, it is most difficult to determine on the face of a substratum, such as a mold, the relative amounts of reinforcement e.g., glass fibers, and resin. Attempts have been made in the past to employ some kind of indicator to physically determine these amounts on the mold. These attempts were met by such problems as "bleeding" where a dye used on the reinforcement was soluble with the resin matrix, causing streaking. Another problem that was encountered was that of poor strand wet-out when a dyed strand was combined with the resinous matrix, i.e. the incorporation of a dye onto the strand inhibited the ability of the strand to fully function as a reinforcement.

From the time of formation of glass fibers to the more distant point in time of their incorporation into a resin matrix to reinforce the same, many processing operations will have had to be carried out. Immediately after the glass fibers are formed and traveling at linear speeds in excess of 10,000 feet per minute, a protective coating is applied to the glass fibers to prevent mutual abrasion. Subsequently, the sized fibers are gathered onto a rotating collection package, which package is preferably dried prior to use in subsequent operations. Subsequent to drying, the packages are positioned on a creel with numerous other packages so that a larger bundle of glass fibers is formed and collected on a roving doff, or so that a plurality of sized strands may be subsequently fed to a chopping machine, whereupon the chopped strands are packaged for a later use as a reinforcement in molding operations.

During spray-up molding operations it is well known in the art that the operator has a difficult time in ascertaining the thickness of the resin-renforcement build-up on the substratum that he is spraying. Only after much experience and trial and error does the operator become substantially efficient.

In the absence of the feasibility to depend upon the experience of operators, it has become necessary to rely upon the development of a more reliable method for ascertaining the build-up of the resin-reinforcement blend on the substratum that is being sprayed.

When glass fibers are treated and prepared according to the inventive concept, dyed glass strands are formed, which when combined with sized strands, and used in a spray-up operation, enable the operator, irrespective of his degree of experience, to form a molded part more uniformly than heretofore possible.

It is therefore an object of this invention to produce a treatment for glass fibers and to produce glass fibers treated with a material to enable the glass fibers in strand form, to be used in subsequent operations, without losing other desirable properties.

It is another object of the invention to provide a new and improved dye-coating for glass fibers so that the coated fibers are capable of being dried prior to being wound on a shippable package.

It is another object of the invention to provide a new and improved coating for glass fibers so that the coated fibers, when combined with sized glass fibers and subsequently used as a reinforcement in resinous matrices, yields a fast color.

Further objects and advantages of the invention will become apparent to those skilled in the art to which the invention relates from the following description.

Dyed strands become extremely important during the introduction of the dyed strands with a resinous matrix during spray-up operations or other fabrication operations. It is desirable to obtain a molded article of uniform thickness, but this becomes difficult when the determination of thickness is dependent upon the experience of an operator. Other applications of dyed tracer yarns include electrical usage to identify wires, and processing usage for color identity in certain products to designate quality and/or weight characteristics.

The treatment is applied most preferably in post-forming operations, although application of the treatment in the forming operation of glass fibers has been demonstrated. However, when the treatment is applied to glass strands at forming, another variable is introduced to the already complex operation. Also, most forming packages, when used in subsequent operations, have some degree of non-usable strands thereon, i.e. due to non-uniform run-out of the package or due to uneven migration of the sizing within the package, a small percentage of strands must be disposed of prior to the efficient use of the forming package.

When the treatment is applied in post-forming operations however, a dyed product is obtained which yields better quality, i.e. consistently higher strand integrity and uniformity of color throughout the strand. Furthermore, the treatment is compatible with the protective sizings applied to the glass fibers. Other advantages of the treatment when applied in post-forming operations include the formation of a shippable package, by a cleaner and more efficient operation, that is capable of withstanding handling in shipment to a greater degree than a forming package, the formation of a dyed package which can be used immediately by the customer, without the customer having to first run out non-uniform strands, and the formation of treated strands which can be combined with sized strands to produce a roving doff, whereby the doff has a tracer strand or indicator therein to help determine the amount of reinforcement in a resinous matrix.

DESCRIPTION OF THE PREFERRED EMBODIMENT

In a preferred embodiment of the invention, glass fibers upon being formed, are coated with a protective sizing so that the fibers may withstand mutual abrasion during handling and processing in subsequent operations. A multiplicity of continuous filament glass fibers approximately 0.00050 inch in diameter were produced by attenuating molten streams of glass at a rate of approximately 10,000 feet/minute. The glass fibers, immediately after solidification, were pulled over a graphite rolled or applicator that was flooded with an aqueous sizing material. A typical sizing material that performed well follows, but which is not a limit of the inventive concept:

| Ingredients | Percent by weight | |
|---|---|---|
| Pelargonic acid-tetraethylene pentamine condensate solubilized with acetic acid | 0.126 | 0.05–1.0 |
| Caprylic acid-tetraethylene pentamine condensate solubilized with acetic acid | 0.054 | 0.01–0.5 |
| Aqueous ammonia | To control pH to from 5.8 to about 6.2 | |
| Polyethylene glycol polymer having an average molecular weight of 950–1,050 | 0.150 | 0.02–1.0 |
| Emulsion polymerized polyvinyl acetate, plasticized with 3 percent dibutyl phtalate | 7.00 | 1.0–12.0 |
| Methacrylate chromic chloride | 1.50 | 0.5–3.0 |
| Deionized water | Balance to adjust solids to from 4.0 to 5.0 | |

The coated fibers were brought together into a strand by a gathering device and the strand was then wound on a rotating drum, mounted on a revolving spindle which pulled the fibers at a rate of approximately 10,000 feet/minute. A suitable traverse mechanism moved the strand back and forth across the drum to produce a coiled package or forming package approximately 10–12 inches wide, with an inside diameter of approximately 6–8 inches, an outside diameter of approximately 8–12 inches, and tapered sides. The forming package was removed from the spindle and dried in an oven at a temperature of about 265° F. for approximately 5–25 hours or until dry. The coated strands on these packages have a strand solids from 1.0–3.0 percent, and most preferably from 1.29–1.39 percent.

Thereafter, a plurality of these forming packages were positioned on a creel for distribution and advancement into a bath containing the following constituents in percent by weight, whereby the solids ranged from about 0.5 to about 2.0:

| Ingredients | Percent by weight | |
|---|---|---|
| Silicone fluid | 0.1 | 0.05–1.0 |
| Styrene insoluble pigment | 1.2 | 0.5–2.0 |
| Methylene chloride | 98.7 | Balance |

The silicone fluid is designated as a tri-methyl chain stopped reaction product of 25 percent methyl, beta, phenyl, propyl polysiloxane and 75 percent methyl, tetradecyl polysiloxane, and is commercially available under the designation "SF 1088" from General Electric Corporation. Specific reference is made to U.S. Pat. 3,579,467, filed Dec. 12, 1966, and issued on May 18, 1971, which more fully describes the silicone fluid. An example of a styrene insoluble pigment is "78–R124 Perylene Scarlet Vybond S" which pigment is a 60% solids dispersion in cellulose acetate butyrate of an alkali and acid resistant non-bleeding, lightfast perylene scarlet vat pigment (Vat Red #29) and is commercially available from Penn Color Dispersions Division of Sun Chemical Corporation. An aqueous dye system may be used, but it requires an external heat source to obtain a dried strand prior to collection. The amount of silicone fluid may vary from 0.01 to about 5.0 percent by weight and the styrene insoluble pigment may be used to obtain the desired color, but generally a range of from about 0.5 to about 7.5 is sufficient. Not all of the styrene insoluble pigments were suitable to the inventive concept because they were not compatible with the previously applied protective sizings.

The mixing procedure used to prepare the treatment above comprises adding into a dry stainless steel kettle the measured amount of methylene chloride. Subsequently, the silicone fluid is added to the kettle with mixing until completely dispersed. To this mix the pigment is added slowly in order to avoid lumping of the pigment. Suitable wiping dies are employed in order to control the amount of treatment applied to the advancing strands.

A suitable mechanism, e.g. a Leesona 959 winder, is employed in order to collect the treated strands onto a shippable package. Prior to collection of the treated strand onto the shippable package, it is preferable to provide for the drying of the treatment on the strands. The drying may be accomplished by air drying or by conventional heating means. The treated, colored strand has a solids of from 1.0 to 5.0 percent and most preferably, from 1.5 to 2.5 percent.

The treatment comprising methylene chloride, silicone fluid and styrene insoluble pigment is compatible with the protective sizing first applied to the glass fibers, in that the treatment does not adversely affect the physical properties of the sized fibers, such as strand integrity, wet-out capabilities, etc. Furthermore, the treatment is capable of withstanding further processing operations whereby the treatment does not flake off or craze, most probably due to a chemical bonding or mechanical interlocking with the protective sizing.

The shippable packages of the treated strands may be formed on a standard single spindle winder or an extension spindle may be added to each winder to obtain two package builds at one time.

Subsequently, the shippable package, treated as above described, is positioned on a creel with a plurality of packages of continuous strands having a protective sizing thereon, and the strands are advanced into a roving machine, in order to form a roving doff or package. The uniqueness of these roving doffs is the fact that uniformly throughout, although not always visible, there is a tracer strand, so that when the doffs are shipped to customers, or to fabrication units, and the roving yarn is fed to a spray-up gun where it is chopped and combined with resin, the tracer strand in the roving greatly facilitates the operator's judgment in the amount of material being sprayed onto a substratum.

In the practice of the invention, at least, one end of dyed continuous strand is combined with a plurality of ends of undyed, but sized, continuous strands when forming a roving doff, the number of ends being varied as desired in order to obtain lighter or darker doffs, or in order to increase or decrease yardage-weight relationships. Preferably, the roving yarn comprises a bundle of continuous glass fiber strands comprising from about 0.5 to about 5.0 percent by weight of uniformly dyed glass strands and from about 95 to 99.5 percent by weight of glass fiber strands having a protective coating thereon. The uniformly dyed glass strands have a first dried deposit of the sizing material hereinabove described and a second dried deposit of the dye treatment hereinabove described. The glass fiber strands having a protective coating thereon comprise a dried deposit of the sizing material hereinabove described.

We claim:

1. A process for obtaining a uniformly dyed glass fiber strand for use in combination with a multiplicity of undyed glass fiber strands comprising the steps of: (a) forming glass fibers from molten streams of glass; (b) applying a protective coating on the glass fibers; wherein the protective coating comprises:

| Ingredients: | Percent by wt. |
|---|---|
| Pelargonic acid-tetraethylene pentamine condensate solubilized with acetic acid | 0.126 |
| Caprylic acid-tetraethylene pentamine condensate solubilized with acetic acid | 0.054 |
| Aqueous ammonia, to control pH to from 5.8 to about 6.2 | |
| Polyethylene glycol polymer having an average molecular weight of 950–1050 | 0.150 |
| Emulsion polymerized polyvinyl acetate, plasticized with 3 percent dibutyl phthalate | 7.00 |
| Methacrylate chromic chloride | 1.500 |
| Deionized water, balance to adjust solids to from 4.0 to 5.0 | |

(c) gathering the coated fibers into a strand; (d) collecting the strand onto a forming package; (e) heating the forming package until the strand throughout the package is dried; (f) advancing the dried strand from the forming package into an impregnant bath, said bath comprising:

| Ingredients: | Percent by wt. |
|---|---|
| Methylene chloride | 98.7 |
| Silicone fluid comprising a tri-methyl chain stopped reaction product of 25 percent methyl, beta, phenyl, propyl polysiloxane and 75 percent methyl, tetradecyl polysiloxane | 0.1 |
| Styrene insoluble alkali and acid resistant, non-bleeding, lightfast, perylene scarlet vat pigment, which pigment is a 60 percent solids dispersion in cellulose acetate butyrate | 1.2 |

(g) drying the strand; and (h) collecting the strand on a shippable package.

2. The process as claimed in claim 1 further comprising combining the dyed glass fiber strand with a multiplicity of sized but undyed glass fiber strands to form a glass fiber roving and collecting the glass fiber roving onto a package.

3. The process as claimed in claim 1 further comprising combining the dried strand of step (g) with a multiplicity of strands treated in accordance with steps (b), (c), (d), and (e).

4. A process for obtaining a uniformly dyed glass fiber strand for use in combination with a multiplicity of undyed glass fiber strands comprising the steps of: (a) forming glass fibers from molten streams of glass; (b) applying a protective coating on the glass fibers, wherein the protective coating comprises:

| Ingredients: | Percent by wt. |
|---|---|
| Pelargonic acid-tetraethylene pentamine condensate solubilized with acetic acid | 0.05–1.0 |
| Caprylic acid-tetraethylene pentamine condensate solubilized with acetic acid | 0.01–0.5 |
| Aqueous ammonia, to control pH to from 5.8 to about 6.2 | |
| Polyethylene glycol polymer having an average molecular weight of 950–1050 | 0.02–1.0 |
| Emulsion polymerized polyvinyl acetate, plasticized with 3 percent dibutyl phthalate | 1.0–12.0 |
| Methacrylate chromic chloride | 0.5–3.0 |
| Deionized water, balance to adjust solids to from 4.0 to 5.0 | |

(c) gathering the coated fibers into a strand; (d) collecting the strand onto a forming package; (e) heating the forming package until the strand throughout the package is dried; (f) advancing the dried strand from the forming package into an impregnant bath, said bath comprising:

| Ingredients: | Percent by wt. |
|---|---|
| Silicone fluid comprising a tri-methyl chain stopped reaction product of 25 percent methyl, beta, phenyl, propyl polysiloxane and 75 percent methyl, tetradecyl polysiloxane | 0.05–1.0 |
| Styrene insoluble alkali and acid resistant, non-bleeding, lightfast perylene scarlet vat pigment, which pigment is 60 percent solids dispersion in cellulose acetate butyrate | 0.5–2.0 |
| Methylene chloride | Balance |

(g) drying the strand; and (h) collecting the strand on a shippable package.

5. The process as claimed in claim 4 further comprising combining the dyed glass fiber strand with a multiplicity of sized but undyed glass strands to form a glass fiber bundle and collecting the glass fiber bundle onto a package.

6. The process as claimed in claim 4 further comprising combining the dried strand of step (g) with a multiplicity of strands treated in accordance with steps (b), (c), (d), and (e).

7. In a process for obtaining a uniformly dyed glass fiber strand for use in combination with a multiplicity of undyed glass fiber strands to form a roving, which roving is used to reinforce resin systems, comprising: (a) forming glass fibers; (b) applying a protective coating on the glass fibers; (c) gathering the coated fibers into a strand; (d) collecting the strand onto a forming package; and (e) heating the forming package until the strand throughout the package is dried; the improvement comprising: (1) advancing the dried strand from the forming package into an impregnant bath, which is compatible with the protective coating of step (b), said bath comprising:

| Ingredients: | Percent by wt. |
|---|---|
| Silicone fluid comprising a tri-methyl chain stopped reaction product of 25 percent methyl, beta, phenyl, propyl polysiloxane and 75 percent methyl, tetradecyl polysiloxane | 0.05–1.0 |
| Styrene insoluble alkali and acid resistant, non-bleeding, lightfast perylene scarlet vat pigment, which pigment is a 60 percent solids dispersion in cellulose acetate butyrate | 0.5–2.0 |
| Methylene chloride | Balance |

(2) drying the impregnated strand; and (3) collecting the dried strand on a shippable package.

8. The process as claimed in claim 7 further comprising combining the dyed glass fiber strand with a multiplicity of sized but undyed glass fiber strands to form a glass fiber bundle having the dyed strand randomly incorporated and periodically surfacing throughout the length of the bundle, and collecting the glass fiber bundle onto a package.

9. A bundle of continuous glass fiber strands in the form of a roving comprising from about 0.5 to about 5 percent by weight of uniformly dyed glass fiber strands and from about 95 to 99.5 percent by weight of undyed glass fiber strands having a protective coating thereon.

10. A bundle of continuous glass fiber strands comprising from about 0.5 to about 5 percent by weight of glass fiber strands comprising a dried deposit of a treatment consisting essentially of, when applied,

| Ingredients: | Percent by wt. |
|---|---|
| Methylene chloride | 98.7 |
| Silicone fluid comprising a tri-methyl chain stopped reaction product of 25 percent methyl, beta, phenyl, propyl polysiloxane and 75 percent methyl, tetradecyl polysiloxane | 0.1 |
| Styrene insoluble alkali and acid resistant, non-bleeding, lightfast, perylene scarlet vat pigment, which pigment is a 60 percent solids dispersion in cellulose acetate butyrate | 1.2 | and from about 95 to 99.5 percent by weight of glass fiber strands having a dried deposit of a treatment consisting essentially of, when applied,

| Ingredients: | Percent by wt. |
|---|---|
| Pelargonic acid-tetraethylene pentamine condensate solubilized with acetic acid | 0.126 |
| Caprylic acid-tetraethylene pentamine condensate solubilized with acetic acid | 0.054 |
| Aqueous ammonia, to control pH to from 5.8 to about 6.2 | |
| Polyethylene glycol polymer having an average molecular weight of 950–1050 | 0.150 |
| Emulsion polymerized polyvinyl acetate, plasticized with 3 percent dibutyl phthalate | 7.00 |
| Methacrylate chromic chloride | 1.500 |
| Deionized water, balance to adjust solids to from 4.0 to 5.0 | |

11. Glass fiber strands having a first dried deposit of a protective material, said material comprising, when applied,

| Ingredients: | Percent by wt. |
|---|---|
| Pelargonic acid-tetraethylene pentamine condensate solubilized with acetic acid | 0.126 |
| Caprylic acid-tetraethylene pentamine condensate solubilized with acetic acid | 0.054 |
| Aqueous ammonia, to control pH to from 5.8 to about 6.2 | |
| Polyethylene glycol polymer having an average molecular weight of 950–1050 | 0.150 |
| Emulsion polymerized polyvinyl acetate, plasticized with 3 percent dibutyl phthalate | 7.00 |
| Methacrylate chromic chloride | 1.500 |
| Deionized water, balance to adjust solids to from 4.0 to 5.0 | | and a second dried deposit of a colorant solution which is compatible with the first dried deposit and which is styrene insoluble, said solution comprising, when applied,

| Ingredients: | Percent by wt. |
|---|---|
| Methylene chloride | 98.7 |
| Silicone fluid comprising a tri-methyl chain stopped reaction product of 25 percent methyl, beta, phenyl, propyl polysiloxane and 75 percent methyl, tetradecyl polysiloxane | 0.1 |
| Styrene insoluble alkali and acid resistant, non-bleeding, lightfast perylene scarlet vat pigment, which pigment is a 60 percent solids dispersion in cellulose acetate butyrate | 1.2 |

12. Glass fiber strands having a first dried deposit of a protective material, said material comprising, when applied,

| Ingredients: | Percent by wt. |
|---|---|
| Pelargonic acid-tetraethylene pentamine condensate solubilized with acetic acid | 0.05–1.0 |
| Caprylic acid-tetraethylene pentamine condensate solubilized with acetic acid | 0.01–0.5 |
| Aqueous ammonia, to control pH to from 5.8 to about 6.2 | |
| Polyethylene glycol polymer having an average molecular weight of 950–1050 | 0.02–1.0 |
| Emulsion polymerized polyvinyl acetate, plasticized with 3 percent dibutyl phthalate | 1.0–12.0 |
| Methacrylate chromic chloride | 0.5–3.0 |
| Deionized water, balance to adjust solids to from 4.0 to 5.0 | | and a second dried deposit of a colorant solution which is compatible with the first dried deposit and which is styrene insoluble, said solution comprising, when applied,

| Ingredients: | Percent by wt. |
|---|---|
| Silicone fluid comprising a tri-methyl chain reaction product of 25 percent methyl, beta, phenyl, propyl polysiloxane and 75 percent methyl, tetradecyl polysiloxane | 0.05–1.0 |
| Styrene insoluble alkali and acid resistant, non-bleeding, lightfast perylene scarlet vat pigment, which pigment is a 60 percent solids dispersion in cellulose acetate butyrate | 0.5–2.0 |
| Methylene chloride | Balance |

13. A glass fiber roving, for use as a reinforcement in spray-up laminate applications to help visually control the thickness of material sprayed onto a substration, comprising from about 0.5 to about 5 percent by weight of glass fiber strands comprising a dried deposit of a treatment consisting essentially of, when applied,

| Ingredients: | Percent by wt. |
|---|---|
| Silicone fluid comprising a tri-methyl chain stopped reaction product of 25 percent methyl, beta, phenyl, propyl polysiloxane and 75 percent methyl, tetradecyl polysiloxane | 0.05–1.0 |
| Styrene insoluble alkali and acid resistant, non-bleeding, lightfast perylene scarlet vat pigment, which pigment is a 60 percent solids dispersion in cellulose acetate butyrate | 0.5–2.0 |
| Methylene chloride | Balance | and from about 95 to 99.5 percent by weight of glass fiber strands having a dried deposit of a treatment consisting essentially of, when applied,

| Ingredients: | Percent by wt. |
|---|---|
| Pelargonic acid-tetraethylene pentamine condensate solubilized with acetic acid | 0.05–1.0 |
| Caprylic acid-tetraethylene pentamine condensate solubilized with acetic acid | 0.01–0.5 |
| Aqueous ammonia, to control pH to from 5.8 to about 6.2 | |
| Polyethylene glycol polymer having an average molecular weight of 950–1050 | 0.02–1.0 |
| Emulsion polymerized polyvinyl acetate, plasticized with 3 percent dibutyl phthalate | 1.0–12.0 |
| Methacrylate chromic chloride | 0.5–3.0 |
| Deionized water, balance to adjust solids to from 4.0 to 5.0 | |

References Cited
UNITED STATES PATENTS

| 2,428,302 | 9/1947 | Trowbridge | 8—18 |
| 2,778,746 | 1/1957 | Steinman et al. | 117—76 T |
| 3,262,809 | 7/1966 | Aber | 117—76 T |
| 3,545,909 | 12/1970 | Gagliardi | 117—126 GS |

DANIEL J. FRITSCH, Primary Examiner

U.S. Cl. X.R.

8—18; 28—75 R; 57—140 G; 117—76 R, 76 T, 126 GR, 126 GS; 161—176